United States Patent
Marzocchi

[11] 3,765,927
[45] *Oct. 16, 1973

[54] GLASS FIBER REINFORCED ELASTOMERS
[75] Inventor: Alfred Marzocchi, Cumberland, R.I.
[73] Assignee: Owens-Corning Fiberglas, Toledo, Ohio
[ * ] Notice: The portion of the term of this patent subsequent to Apr. 25, 1989, has been disclaimed.
[22] Filed: Jan. 11, 1971
[21] Appl. No.: 105,202

[52] U.S. Cl............ 117/72, 117/119, 117/126 GB, 117/126 GS
[51] Int. Cl... B32b 17/10, B32b 25/10, B32b 25/14
[58] Field of Search............... 117/126 GB, 126 GS, 117/72, 119

[56] References Cited
UNITED STATES PATENTS
3,684,470  8/1972  Marzocchi.................... 117/126 GB
3,658,571  4/1972  Marzocchi............................ 117/72
3,384,505  5/1968  Palmer et al......................... 117/119
3,449,152  6/1969  Detrick et al........................ 117/119
3,413,186  11/1968  Marzocchi..................... 117/126 GB
3,505,100  4/1970  Vanderbilt et al............ 117/126 GS
3,591,357  7/1971  Janetos et al. ..................... 117/76 T Primary Examiner—William D. Martin
Assistant Examiner—William H. Schmidt
Attorney—Staelin & Overman

[57] ABSTRACT

Glass fibers for use in glass fiber-reinforced elastomeric products are produced by impregnating a bundle of previously sized glass fibers with a composition containing a high surface tension elastomer latex, then passing the impregnated bundle into a region of reduced pressure which contains a blend of an elastomer compatible material and an elastomer, and finally applying a top coating of the elastomer compatible material.

11 Claims, 7 Drawing Figures

PATENTED OCT 16 1973 3,765,927
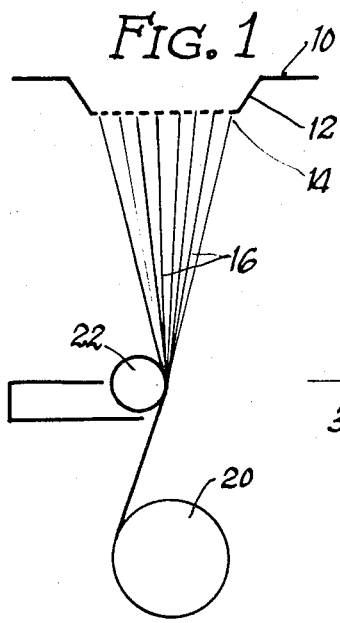
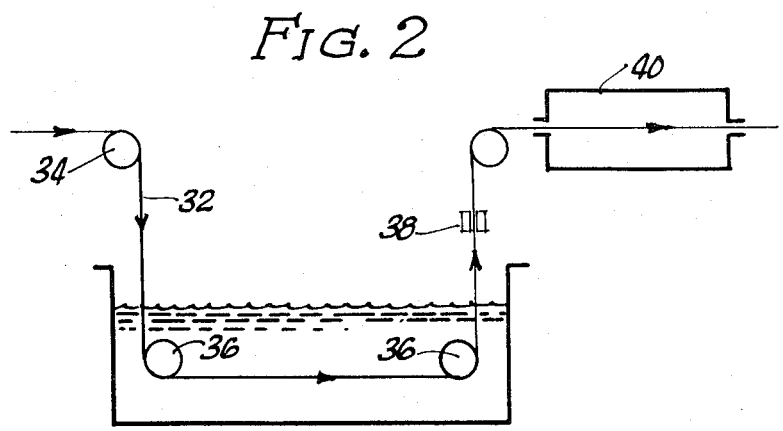
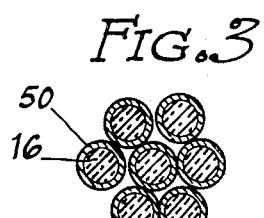
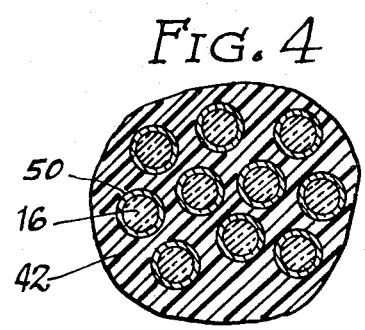
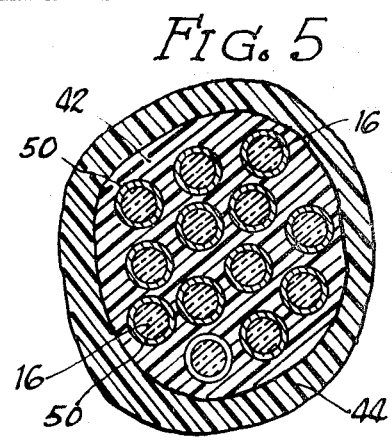
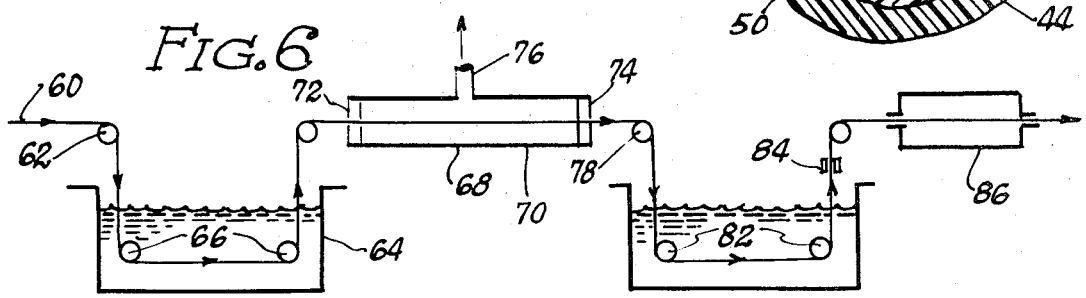
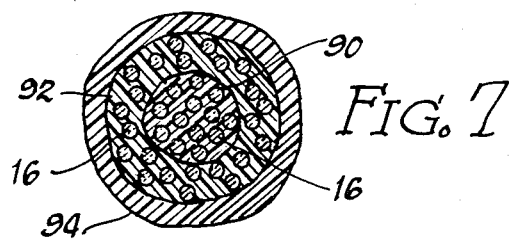
INVENTOR
Alfred Marzocchi
by Staelin and Overman
Attys

GLASS FIBER REINFORCED ELASTOMERS

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attentuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha monoolefin having from three to 20 carbon atoms, such as propylene, and a polyene, such as dicyclopentadiene, 1-4 hexadiene and preferably an alkylene or alkylidene norbornene, such as 5-alkylidene-2-norbornene and the like in which the alkylidene group numbers from two to 12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of this inventino to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which:

FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

FIG. 2 is a flow diagram illustrating the treatment of glass fibers subsequent to their being formed into bundles, strands, yarns, cords or fabrics to impregnate the glass fiber bundles in accordance with the preferred practice of this invention;

FIG. 3 is a cross-sectional view of glass fibers processed in accordance with the diagram illustrated in FIG. 1;

FIG. 4 is a cross-sectional view of a bundle of glass fibers processed in accordance with the flow diagram of FIG. 2;

FIG. 5 is a cross-sectional view of a double impregnated yarn in accordance with one embodiment of the present invention;

FIG. 6 is a flow diagram illustrating another embodiment wherein glass fibers are treated subsequent to their being formed into bundles, strands, yarns, cords or fabrics to provide a double or triple impregnated bundle; and FIG. 7 is a cross-sectional view of glass fiber processed in accordance with the diagram illustrated in FIG. 6.

Until recently, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to a new and improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized or preferably unsized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber-elastomeric products.

The following examples will serve to illustrate the principal concepts of this invention in a composition and method for the treatment, as by impregnation, of bundles, yarns, cords and fabrics of glass fibers wherein the fibers have previously been sized in forming with a conventional size composition which has preferably been modified to embody a glass fiber anchoring agent.

EXAMPLE 1

Forming Size Composition
8.0% by weight partially dextrinized starch
1.8% by weight hydrogenated vegtable oil
0.4% by weight cationic wetting agent(lauryl amine acetate)
0.2% by weight nonionic emulsifying agent
1.0% by weight gamma-aminopropyltriethoxy silane
88.6% by weight water

EXAMPLE 2

Forming Size Composition
3.2% by weight saturated polyester resin
0.1% by weight fatty acid amine wetting agent (Nopcogen 16 L)
0.1% by weight polyvinyl alcohol
3.0% by weight pyrrolidine
0.3% by weight gamma-aminopropyltriethoxy silane
0.1% by weight glacial acetic acid
93.2% by weight water

EXAMPLE 3

Forming Size Composition
0.2% by weight paraffin wax in aqueous emulsion
1.3% by weight cationic amide polyester resin
2.3% by weight polyglycol condensate (300 to 400 m w )
0.25% by weight gelatin
0.5% by weight gamma-aminopropyltriethoxy silane
0.1% by weight dibasic ammonium phosphate
0.2% by weight glacial acetic acid
95.15% by weight water Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads or cords which may be used as a reinforcement for elastomeric materials, with or without cutting to shorter lengths, and which can be formed into woven or nonwoven fabrics for subsequent combination with elastomeric materials.

After the fibers have been processed into strands, yarns, cords or fabrics, hereinafter referred to generally as bundles, the bundles of sized glass fibers are impregnated with a composition embodying the features of this invention, as represented by the following examples:

EXAMPLE 4

Impregnating Composition
30% by wt. Butadiene-acrylonitrile copolymer latex (50% solids — "Hycar—187246")
70% by wt. Water Impregnation with the aqueous composition of Example 4 can be made by conventional means for impregnation, such as by immersion of the bundles of glass fibers in a bath of aqueous impregnating composition. Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter, the endless bundle is advanced over the roller 39 into a drying oven preferably in the form of an air drying oven maintained at a temperature above ambient temperature and preferably at a temperature within the range of 150° to 350°F. to accelerate removal of the aqueous diluent and to set the impregnating material in situ in the glass fiber bundle. Drying will occur in a relatively short period of time, ranging from 1–30 minutes, depending somewhat upon the temperature of drying. Alternatively, use can be made of dielectric or high frequency treatment to coagulate the latex with little or no drying.

The butadiene-acrylonitrile copolymer latex is a latex available from B. F. Goodrich Chemical Company under the tradename "Hycar" and has a high surface tension, i.e., a surface tension of the order of 55 dynes per centimeter at ambient temperatures and pressures. The Hycar latices are colloidal systems which are essentially free of emulsifiers or other water-sensitive materials. Various other high surface tension latices may be used in place of the latex shown in Example 4, including butadiene polymers, copolymers of butadiene with styrene (marketed under the tradename of GOOD-RITE, such as GOOD-RITE 1800X73) and terpolymers of butadiene, styrene and acrylonitrile. Suitable latices are those having surface tension greater than 40 dynes per centimeter and preferably 50 dynes per centimeter at ambient temperatures.

The amount of the high surface tension latex in the impregnating composition may be varied such that the solids content of the impregnating composition is between 2 and 50 percent by weight, and preferably within the range of 10–50 percent by weight solids. The impregnating composition is applied to the glass fiber bundle in an amount to deposit dry solids of 5–25 percent by weight and preferably 10–15 percent by weight of the imprenating glass fiber system.

Other examples of the use of high surface tension latices will be illustrated by the following examples.

EXAMPLE 5

Impregnating Composition
25.0% by weight — butadiene-styrene copolymer latex(48% solids—"GOOD-RITE 1800X73")
75.0% by weight — water The foregoing butadiene-styrene copolymer latex is a colloidal system essentially free of emulsifiers and other water-sensitive ingredients, and has a surface tension of about 70 dynes per centimeter at ordinary temperatures.

EXAMPLE 6

Impregnating Composition
30.0% by weight polybutadiene latex(40% solids—"Hycar 1870X3")
65.0% by weight water The foregoing colloidal system has a surface tension of about 55 dynes per centimeter.

EXAMPLE 7

Impregnating Composition
32.0% by weight acrylonitrile-butadiene-styrene terpolymer latex(50% solids—"Hycar 1877X8")
68.0% by weight water The surface tension of the terpolymer latex employed in this example is 60 dynes per centimeter at ordinary temperatures.

The impregnating compositions in Examples 5–7 are applied in the same manner as disclosed in Example 4 so as to deposit dry solids constituting 5–25 percent by weight of the impregnated glass fiber system.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against destruction by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can be employed in the cured or uncured state or in the vulcanized or unvulcanized state. It is believed that the tie-in between the impregnated bundles of glass fibers and the elastomeric material forming the continuous phase will occur primarily during cure of vulcanization of the elastomeric material during the fabrication of the elastomeric material.

More complete protection for the individual glass fibers and a fuller coordination with the elastomeric material in the continuous phase can be achieved when the impregnating compositions of Examples 4 to 7 are modified for treatment of the glass fibers as a size composition which can be applied to the individual glass fibers as they are formed, as illustrated in FIG. 1 of the drawing, or afterwards if the original size is removed. For this purpose, the impregnating composition of this invention should be formulated to include an anchoring agent, such as gamma-aminopropyltriethoxy silane. Instead of gamma-aminopropyltriethoxy silane, in the size or in the impregnating composition, use can be made of other organo silicon compounds in which the organic group attached to the silicon atom contains an amino group, such as gamma-aminovinyldiethoxy silane, gamma(triethoxysilylpropylamide) propylamine, N(gamma-triethoxysilylpropyl)propylamine, beta-aminoallyltriethoxy silane, and para-aminophenyltriethoxy silane. Use can be made of other organo silicon compounds in the form of a silane, silanol or polysiloxane in which the organic group attached to the silicon atoms contains an epoxy group, such as glycydoxypropyltrimethoxy silane or 3,4-epoxycyclohexylethyltri-methoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, B-alanine chromic complex, or glycylato chromic chloride.

A forming size composition embodying the further concepts of the present invention can be formulated as follows:

EXAMPLE 8

15–50% by wt. high surface tension elastomer latex
0.1–3% by wt. anchoring agent 0–5% by wt. quaternary ammonium hydroxide To the foregoing, water is added to form an aqueous dispersion having a solids content within the range of 2–10 percent by weight. Application should be made in an amount to deposit dry solids constituting 1–4 percent by weight of the sized glass fibers.

It is possible and sometimes desirable, when formulating compositions of the high surface tension latexes used in this invention with anchoring agents of the type described, to include in the composition a quaternary ammonium hydroxide to adjust the pH of the system to the alkaline side, and preferably to a pH of 8 or higher, to insure that the anchoring agent will remain in solution. For this purpose, use can be made of tetraalkyl ammonium hydroxides in which the alkyl groups contain one to 20 carbon atoms and tetraalkanol ammonium hydroxides in which the alkanol groups contain one to 10 carbon atoms. Representative of such compounds include tetramethyl ammonium hydroxide, tetraethyl ammonium hydroxide, trimethylstearyl ammonium hydroxide, tetraethanol ammonium hydroxide, etc.

EXAMPLE 9

20.0% by wt. — Butadiene-styrene copolymer latex(42% solids-GOOD-RITE 1800X73)
1.0% by wt. — Gamma-aminopropyltriethoxy silane
79.0% by wt. — Water It will be understood that the size compositions, represented by Examples 8 and 9, may also be employed as impregnating composition, preferably with lesser diluent with aqueous medium, since the anchoring agent employed in the size composition will continue to operate as an anchoring agent to further facilitate the bonding relationship or integration between the elastomeric material in the continuous phase and the treated glass fibers. it will be further understood that the glass fibers may be sized in forming with a size composition represented by Examples 8 and 9, followed by impregnation of strands, yarns, cords, fabrics and bundles formed thereof with impregnating composition of this invention as represented by Examples 4 to 7.

In accordance with a further concept of the present invention, the bonding relationship between glass fibers and elastomeric materials may be further enhanced by impregnation of a glass fiber bundle with a high surface tension latex of the type described herein, and then further impregnating the bundle with an elastomer compatible material, such as a resorcinol aldehyde latex (referred to hereinafter as RFL).

One such method for effecting such double impregnation may be illustrated by reference to the following example.

EXAMPLE 10

A glass fiber bundle is impregnated with a butadiene acrylonitrile copolymer latex having a surface tension at ambient temperature of about 55 dynes per centimeter in the same manner described in Example 4. Thereafter, the bundle is passed into a second bath which contains the following composition:

30.0% by wt. — Natural rubber latex-resorcinol formaldehyde (38% solids"Lotol 5440")
70.0% by wt. — Water The foregoing is applied in such an amount that 1–25 percent by weight RFL is deposited upon the impregnated glass fiber bundle to form a second coating on the glass fiber bundle.

The resulting fiber bundle is shown in FIG. 5 wherein it is illustrated that the individual glass fibers 16 have a thin size coating 24 thereon and are separated one from the other by means of the high surface tension elastomer latex impregnant 42. The RFL impregnant 44 constitutes a top coating on the elastomer latex impregnant 42 as illustrated in this figure.

Suitable resorcinol aldehyde resins and combinations thereof with natural rubber latex are marketed by the U. S. Rubber Company under the tradename "Lotol 5440." For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

In accordance with the concept of the invention, it is generally preferred to effect the double impregnation in a manner whereby the high surface tension elastomer latex is concentrated toward the center of the glass fiber bundle and the periphery of the glass fiber bundle contains a mixture of the high surface tension latex and the elastomer compatible material. If desired, a third coating of the elastomer compatible material may be provided.

The following examples illustrate the preferred method according to this concept of the invention.

EXAMPLE 11

Composition I
High Surface Tension Elastomer Latex Impregnating Composition
30.0%—Butadiene-acrylonitrile copolymer latex(50% solids—"Hycar 1872X6")
70.0%—Water Composition II
Elastomer Compatible Material Impregnating Composition Part A:
732 parts by weight distilled water
1 part by weight sodium hydroxide
48 parts by weight resorcinol formaldehyde polymer in the form of a latex containing 75% solids (Penacolyte R—2170)
16 parts by weight formalin(37% formaldehyde)

Part B:
900 parts by weight butadiene-styrene-vinyl pyridine terpolymer(42% solids)
80 parts by weight ammonium hydroxide Part C:
200 parts by weight water
15 parts by weight ammonium hydroxide
350 parts by weight vinyl chloride-vinylidene-chloride copolymer(50% by weight solids-Dow Latex 874)
200 parts by weight microcrystalline paraffin wax(-melting point 145–150°F.)-Vultex Wax Emulsion No. 5 of General Latex and Chemical Corp. (56% solids)

The elastomer compatible impregnating material in Composition II is a tack-free impregnant system of the type described in copending application Serial No. 595,036, now U.S. Pat. No. 3,567,671. Part A of the composition is separately prepared by combining the ingredients and then aging for about 2-3 hours with alkali present in an amount sufficient to advance to PH to between 7 and 7.5. The remainder of the ingredients are combined and the various parts are then mixed together. Aging of the entire mixture is not essential but beneficial results occur such as greater adhesion and stability of the mixture, after aging the entire mixture for from 10-24 hours before using the mixture to impregnate the glass fiber bundle. Impregnation can be made in an conventional manner, although it is generally preferred to employ the process schematically as illustrated in FIG. 6.

Referring specifically to FIG. 6, a glass fiber bundle 60 is advanced over a guide roller 62 for passage downwardly into bath 64 containing impregnating Composition I. The bundle is turned under roller 66 to effect a sharp bend which operates to open the bundle to facilitate fuller penetration by the impregnating composition into the bundle of sized glass fibers. The bundle is then raised from the bath for passage to a second bath 68 which may contain impregnating Composition II in a closed tank 70 having wiping orifice dies 72 and 74 at either end, both of which serve to work the impregnants into the bundle and remove any excesses.

Tank 70 is closed except for line 76 which is connected to a source of a vacuum whereby the bundle is subjected to a reduced pressure zone as it enters bath 68 causing the tack-free impregnant to be pulled into the glass fiber bundle thereby forming a second coating on the bundle comprising a mixture of the high surface tension latex and the elastomer compatible impregnant. Thereafter, the bundle is passed through die 74 to remove excess before being advanced over roller guide 78 for passage downwardly into bath 80 which also contains composition II, where the bundle is passed under rollers 82 whereby a third coating is applied to the glass fiber bundle.

The bundle is then passed through wiping die 84 to remove excess RFL and to a drying over 86, preferably in the form of an air drying oven maintained at a temperature about ambient temperature, preferably within the range of 150° to 350° F to accelerate removal of the aqueous component of the impregnants and to set the impregnants in situ in the glass fiber bundle. Depending somewhat upon the temperature of the oven, the drying time will vary between 1 and 45 minutes.

As can be seen in FIG. 7, the impregnated glass fiber bundle produced by the method of Example 11 comprises three disctinct phases, the first being an inner phase comprising a portion of glass fibers 16 comprising the bundle dispersed in the high surface tension elastomer latex 90, the second phase comprising the remaining glass fibers 16 of the bundle dispersed in a mixture 92 of the high surface tension elastomer latex and the elastomer compatible material and the third phase comprising a coating 94 of the elastomer compatible material. The intermediate phase comprising the glass fibers, on the periphery of the glass fiber bundle, which are dispersed in a mixture of the high surface tension elastomer latex and the elastomer compatible material operates to securely intertie the elastomer compatible material to the glass fibers dispersed within the elastomer latex phase when the impregnated bundle, or the impregnated bundle admixed with an elastomer constituting the continuous phase of the final glass fiber-reinforced elastomeric product, is cured.

The resulting impregnated glass fiber bundles prepared in Example 11 are molded between strips of neoprene rubber in order to test the adhesion of the inpregnated glass fiber bundles to the neoprene elastomer. The same temperature and pressure conditions for molding are employed in each test, the results of which are as follows:

| SAMPLE | FIRST PULL | SECOND PULL |
|---|---|---|
| 1 | 43 | 60 |
| 2 | 39 | 58 |
| 3 | 38 | 52 |
| 4 | 40 | 62 |
| 5 | 37 | 47 |
| 6 | 40 | 58 |

Samples 7 and 8 prepared in this manner are subjected to a temperature of 400° F. for 15 seconds in order to test the effects of high temperatures upon the adhesive characteristics of the treated glass fiber bundle, and the following results are evidenced.

| SAMPLE | FIRST PULL | SECOND PULL |
|---|---|---|
| 7 | 43 | 48 |
| 8 | 39 | 53 |

As indicated, the elastomer compatible impregnating composition(CompositionII) of Example 11 is more completely described in application Ser. No. 595,036, now U.S. Pat. No. 3,567,671. The essential ingredients of this composition include the resorcinol formaldehyde resin, the butadiene-styrene vinyl pyridine terpolymers, the latex and the wax component. In addition, the elastomer compatible impregnating composition is preferably formulated to include a vinyl chloride-vinylidene chloride copolymer and/or an acrylic resin.

The resorcinol formaldehyde component comprising the condensation reaction product of resorcinol and formaldehyde in the molecular ratio of about 2 to 1, and is present in the impregnating composition in an amount within the range of 2-10 percent by weight based upon the solids present. The terpolymer latex components are compatible with the resorcinol formaldehyde resin, and are present within the range of 20-60 percent by weight, and 15-40 percent by weight, respectively, based upon the solids present.

The Vultex wax comprises a microcrystalline paraffin wax which is present in an amount in excess of that capable of remaining compatible with the solids making up the remainder of the impregnating composition whereby the wax component sweats out for concentration on the surfaces of the impregnated bundle of glass fibers to provide a non-tacky surface which enables the bundles to be processed into yarns, threads, cords and fabrics and to be wound onto and unwound from spools without seizure or bonding notwithstanding the elastomeric material with which the bundles of glass fibers are impregnated. The amount of microcrystalline wax present in the impregnating composition can be varied within the range of 5-25 percent based upon the solids present.

It will be appreciated that a variety of other elastomer compatible materials may be employed in lieu of that material described in Composition II in Example 11. For example, it is possible to employ a resorcinol aldehyde latex of the type employed in Example 10 as illustrated by the following example.

EXAMPLE 12

The procedure of Example 11 is repeated except that Composition II employed therein is replaced by the following elastomer compatible impregnating composition.

30.0% by weight natural rubber latex-resorcinol formaldehyde resin(38% solids—"Lotol 5440")
70.0% by weight water Again, excellent adhesion between the treated glass fiber bundle and an elastomer is experienced.

In addition, it is also possible to employ an impregnating composition of the type disclosed in U. S. Pat. No. 3,424,608, wherein the elastomer compatible impregnant is formulated in accordance with the following example.

EXAMPLE 13

The procedure of Example 12 is repeated except that the resorcinol formaldehyde-natural rubber latex is replaced by the following impregnating composition:

| | Parts by Weight |
|---|---|
| Resorcinol formaldehyde resin | 2-10 |
| Formaldehyde(37% solution) | 1-3 |
| Concentrated ammonium hydroxide | 2-5 |
| Vinyl pyridine terpolymer(42% solids) | 15-50 |
| Neoprene rubber latex(50% solids) | 25-50 |
| Butadiene latex(60% dolids) | 5-15 |
| Alkali metal hydroxide | 0.05-0.2 |

Water is incorporated with the foregoing materials in amounts to produce an impregnating composition having a minimum solids content of 10 percent and a maximum solids content of about 50 percent by weight. Introduction should be made in an amount to impregnate with a dry solids of 5-25 percent by weight of the glass fiber system and preferably 10-15 percent by weight.

It will similarly be understood that either or both of the impregnating compositions employed in Examples 10-13 may contain an anchoring agent, described in Examples 8 and 9, which operates to further establish a bonding relationship between the glass fiber bundle and the elastomer when the glass fiber bundle is combined with elastomeric materials in the manufacture of glass fiber-reinforced elastomeric products.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber-elastomeric product.

It will be apparent that I have provided a new and improved method for use in the treatment of bundles of glass fibers to enhance their integration with elastomeric materials in the manufacture of glass fiber-elastomeric products.

It will be understood that invention exists not only in the treated glass fibers for use with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

I claim:

1. In the manufacture of glass fiber reinforced elastomeric products in which the elastomeric material comprises a continuous phase in which the glass fibers are distributed, the treatment of glass fibers which is effective to establish a strong bonding relationship between the glass fibers and the elastomeric material comprising impregnating a glass fiber bundle with an elastomer latex having a surface tension greater than 40 dynes per centimeter, passing the bundle impregnated with said elastomer latex into a zone of reduced pressure, said zone containing an elastomer compatible material comprising a blend of a resorcinol-aldehyde resin and an elastomer to form an intermediate phase comprising a mixture of said latex and said blend, and subsequently coating said bundle with said elastomer compatible material to form a bundle having an inner phase of said elastomer latex and glass fibers, an intermediate phase of said mixture and glass fibers, and an outer phase of said elastomer compatible material.

2. A method as defined in claim 1 wherein said latex is essentially free of a surface active agent.

3. A method as defined in claim 1 wherein said elastomer is selected from the group consisting of polymers of butadiene, copolymers of butadiene and styrene, copolymers of butadiene and acrylonitrile and terpolymers of butadiene, styrene and acrylonitrile.

4. A method as defined in claim 1 wherein said latex is applied in an amount so as to deposit dry solids constituting 5-25 percent by weight of said impregnated bundle.

5. A method as defined in claim 1 wherein said elastomer compatible material is applied in an amount to deposit dry solids constituting 1-25 percent by weight of the glass fiber system.

6. A method as defined in claim 1 wherein said elastomer compatible material comprising a mixture of a resorcinol aldehyde resin, a butadiene-styrene-vinyl pyridine terpolymer, a carboxylated butadiene-styrene latex and an incompatible wax.

7. A method as defined in claim 6 wherein said elastomer compatible material also includes a material selected from the group consisting of an acrylic resin, a vinyl chloride-vinylidene chloride copolymer and mixtures thereof.

8. A method as defined in claim 1 wherein said elastomer latex includes an anchoring agent.

9. A method as defined in claim 1 wherein said elastomer compatible material includes an anchoring agent.

10. A method as defined in claim 1 wherein the glass fiber bundle is formed of glass fibers having a thin size coating on the surfaces thereof.

11. A method as defined in claim 1 wherein the glass fiber bundle is in the form of a cord composed of strands of glass fibers.

* * * * *